(12) United States Patent
Blakeslee et al.

(10) Patent No.: US 9,704,170 B2
(45) Date of Patent: Jul. 11, 2017

(54) METHOD FOR TRACKING ITEMS USING A FUND PROCESSING DEVICE

(71) Applicant: Bank of America Corporation, Charlotte, NC (US)

(72) Inventors: Samuel C. Blakeslee, Fort Myers, FL (US); James Pierce, Charlotte, NC (US); Rebecca S. Morgan, Charlottesville, VA (US)

(73) Assignee: Bank of America Corporation, Charlotte, NC (US)

( * ) Notice: Subject to any disclaimer, the term of this patent is extended or adjusted under 35 U.S.C. 154(b) by 653 days.

(21) Appl. No.: 14/145,965

(22) Filed: Jan. 1, 2014

(65) Prior Publication Data

US 2015/0186905 A1     Jul. 2, 2015

(51) Int. Cl.
*G06Q 10/00* (2012.01)
*G06Q 30/02* (2012.01)
*G06Q 40/06* (2012.01)
*G06Q 40/00* (2012.01)

(52) U.S. Cl.
CPC ......... *G06Q 30/0202* (2013.01); *G06Q 40/06* (2013.01); *G06Q 40/12* (2013.12)

(58) Field of Classification Search
CPC .... G06Q 10/00; G06Q 40/00; G06Q 30/0202; G06Q 40/12; G06Q 40/06; G06F 17/60
USPC ....................................................... 705/7.31
See application file for complete search history.

(56) References Cited

U.S. PATENT DOCUMENTS

| | | | | |
|---|---|---|---|---|
| 6,421,653 B1* | 7/2002 | May | ................. | G06Q 30/08 705/36 R |
| 8,090,524 B2* | 1/2012 | Chapman | ........... | G01C 21/3691 701/117 |
| 8,219,503 B2* | 7/2012 | Takahashi | ............ | G06Q 10/063 705/26.1 |
| 8,577,802 B1* | 11/2013 | Nichols | .................. | G06Q 10/08 705/35 |
| 8,768,809 B1* | 7/2014 | Cole | ..................... | G06Q 40/02 705/35 |
| 8,972,283 B2* | 3/2015 | Hicks | ................. | G06K 7/10891 705/17 |
| 2003/0050891 A1* | 3/2003 | Cohen | ................... | G06Q 10/10 705/42 |

(Continued)

*Primary Examiner* — Romain Jeanty
(74) *Attorney, Agent, or Firm* — Weiss & Arons LLP; Michael A. Springs, Esq.

(57) ABSTRACT

Tools for forecasting financial instrument transfers are provided. The tools may include a funds processing system. The funds processing system may be established at a client location. The funds processing system may receive a plurality of items. The items may include one or more financial instruments. The items may include one or more attachments. The items may be processed using the funds processing system. Data corresponding to the items may be transmitted to a financial institution. The data may be used to compute a forecast. The forecast may be based at least on part on data received via the funds processing system. Data analytical models may forecast future requirements. The requirements may be pickup requirements. The pickup requirements may be financial instrument pickup requirements. The forecast may be a time forecast. The time may be an estimated arrival time. The estimated arrival time may be at the financial institution.

9 Claims, 10 Drawing Sheets

(56) References Cited

U.S. PATENT DOCUMENTS

2005/0177437 A1\* 8/2005 Ferrier .................. G06Q 20/02
705/26.8
2011/0289014 A1\* 11/2011 Shroff ................. G06Q 10/083
705/335

\* cited by examiner

METHOD FOR TRACKING ITEMS USING A FUND PROCESSING DEVICE

BACKGROUND

Businesses and other entities (individually or collectively, "entity" or "entities") typically require a steady supply of cash and/or other financial instruments to facilitate daily operations. Additionally, an entity may handle, process and/or accumulate a significant amount of cash and/or other financial instruments on a daily basis.

There is often a preference for such entities to keep sufficient funds or cash on hand in order to adequately supply the entity for daily purchasing needs, as well as to provide sufficient change, often in the form of smaller denominations, to one or more customers of the entity.

Entities may receive a volume of cash and/or other financial instruments that exceeds their daily needs. Therefore, there may be a need to transfer cash at numerous times during the day. This may be due in part to a reluctance to keep large sums of cash on hand. The reluctance may be due to liability and security concerns, a desire to maintain adequate cash flow in an account, or due to a lack of sufficient and adequate storage space for the cash. Therefore, an entity may desire to schedule multiple funds transfers, on a daily basis, from the entity to a financial institution.

Additionally, an entity may desire to exchange larger denominations of cash for smaller denominations in order to more readily provide change to customers.

Such entities may temporarily store a portion of their deposits in a vault until a transfer service, such as a cash transfer service or an armored car service, arrives to pick up and transfer the funds to another location. Once the deposits are moved offsite by the transfer service, an entity is typically unable to track the movement of such deposits until, at some later point in time, the deposits clear with the financial institution. Moreover, the financial institution may remain unaware of certain deposits that are expected to arrive at, and/or are en-route to, the financial institution.

Therefore, because entities are typically unable to track the movement of their funds, they often remain unaware of the status and progression of a deposit. It would be desirable, therefore, to provide increased tracking for the progression and movement of deposits at various points, both in terms of transit time and processing progression.

Further, financial institutions often receive only one update regarding transfers and deposits originating from an entity. The update is typically received at the close of business. This prevents the financial institution from analyzing client needs in real-time and responding appropriately.

It would be desirable, therefore, to provide for increased monitoring and reporting of entities' fund transfers. It would be further desirable to increase the frequency of such reporting in order to allow for a more immediate response to client needs, as well as increased processing efficiency, both by the financial institution and the transfer service. It would be yet further desirable to provide tools for an entity to monitor the status of fund transfers, and to provide an update on the progression of the fund transfers.

Therefore, systems and methods for forecasting and reporting funds usage and transfer are provided.

SUMMARY OF THE INVENTION

Apparatus, methods, code and encoded media (individually or collectively, "the tool" or "the tools") for forecasting financial instrument transfers in a complex machine information environment are provided. The complex machine information environment may be administered by a financial institution.

The tools may include a funds processing system. The funds processing system may be established at a client location. The funds processing system may receive a plurality of items at the client location. The items may include one or more financial instruments. The items may include one or more attachments. The tools may receive tracking information. The tracking information may correspond to one or more of the items.

The tools may process one or more of the items. The items may be processed using the funds processing system. The tools may transmit data corresponding to the one or more items. The data may be transmitted to a financial institution. The data may be transmitted via the funds processing system.

The tools may compute a data analytical model. The data analytical model may be used to forecast a result. The forecast may be based at least on part on data received via the funds processing system.

The data analytical model may forecast a future requirement. The requirement may be a pickup requirement. The pickup requirement may be a financial instrument pickup requirement.

The data analytical model may forecast a time. The time may be an estimated time. The estimated time may be an estimated arrival time. The time may be an arrival time of the items at the financial institution.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
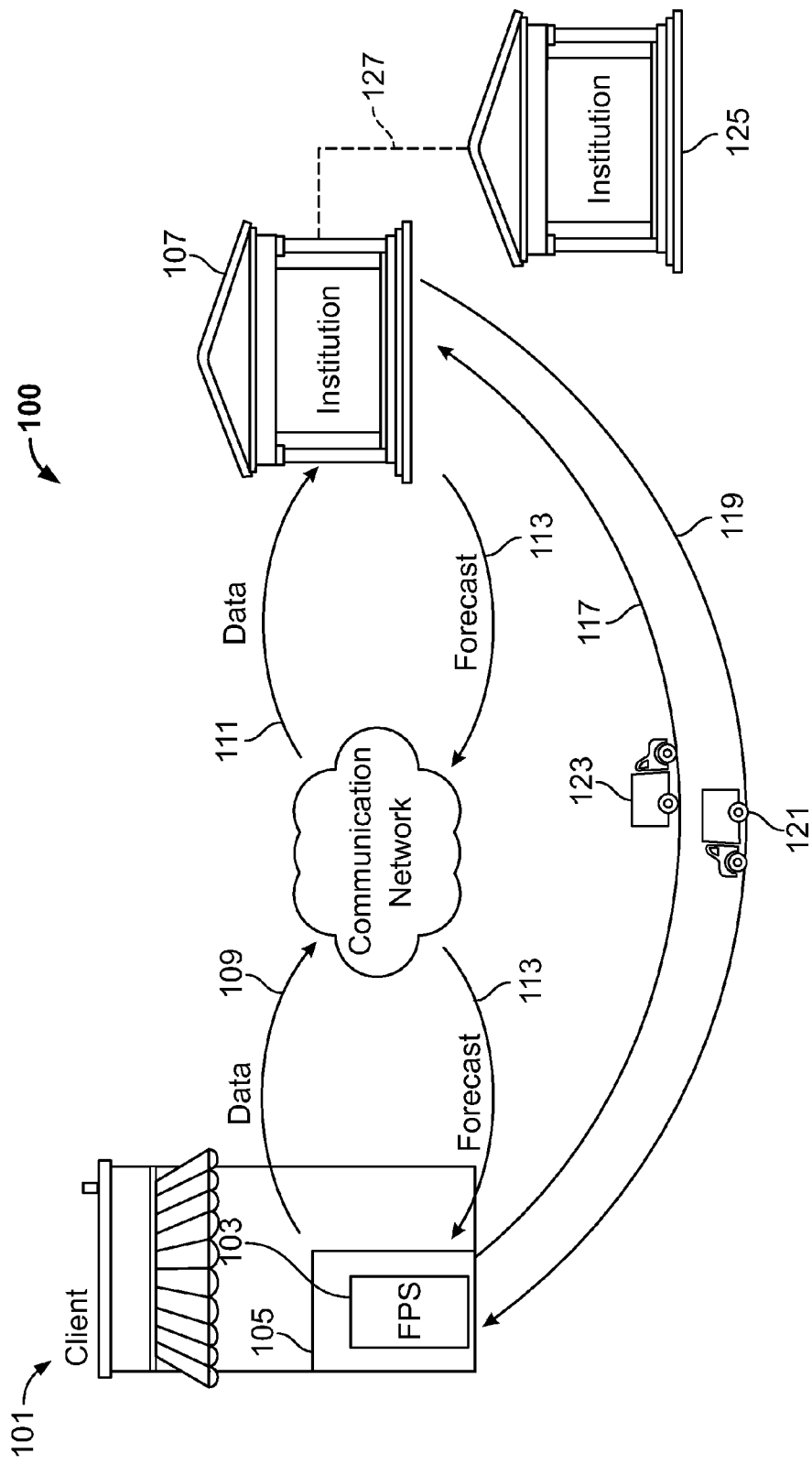
FIG. 1 shows illustrative information in accordance with the principles of the invention.

Apparatus, methods, code and encoded media (individually or collectively, "the tool" or "the tools") for increasing financial data tracking efficiency in a complex machine information environment are provided. The environment may be administered by an institution. The institution may be a financial institution.

The tools may include a funds processing system ("FPS"). The FPS may be a funds processing device ("FPD"). The FPS may be any suitable apparatus for processing information. The FPS may be any suitable apparatus for receiving one or more items. The FPS may be a kiosk, a terminal, an automated teller machine ("ATM"), a self-service device ("SSD"), a cash handling device or any suitable apparatus for receiving information or items.

The FPS may be a stand-alone FPS. The FPS may be located at a remote location. The FPS may be established at the remote location. The remote location may be a client location. The FPS may be part of a network of multiple FPSs. The FPS network may be operated or maintained by a financial institution. The FPS may be serviced or maintained by the financial institution. The FPS or FPS network may be serviced or maintained by a third party.

The FPS may include an acceptor. The acceptor may be configured to accept one or more items. The acceptor may be configured to receive one or more items. The items may be collected by the FPS. The acceptor may be a feeder. The feeder may feed the items to one or more additional FPS components.

The FPS may receive an item. The item may be one or more items. The FPS may receive a plurality of items. The item may be received at a client location.

The item may be any tangible item. The item may be an item of monetary value. The item may be a bank note, U.S. Treasury note, check, cash, promissory note, warrant, bond, payment slip, stock certificate, payment receipt, T-bill, negotiable instrument or any other suitable financial instrument (individually or collectively, "the financial instrument" or "the financial instruments"). The item may be any item with no associated monetary value. The item may be an attachment. The attachment may be a record, image cash letter, contract, payment stub, photograph, table of contents, account identifier, account destination list, file, memo, voucher, ticket, receipt or any other suitable document (individually or collectively, "the attachment" or "the attachments").

The acceptor may be configured to retract one or more of the items. The retracted items may be items inserted by a client. The retraction may be performed by an automated retraction apparatus.

The FPS may include a sensor. The sensor may be a scanner, a camera, a scale, a measuring device, a bill counter, an optical device or any suitable sensor. The sensor may examine the items. The camera may photograph the items. The photograph may be stored in computer-readable memory. The photograph may be transmitted to an off-site server or database.

The sensor may weigh one or more of the items. Each item in a group of items may be weighed individually. Each item may be weighed as part of an associated grouping. For example, all items of monetary value may be weighed together. Weight information may be used for any suitable purpose, such as shipping or transport calculations, validity or counterfeiting analysis, value of notes, or number of notes.

The sensor may extract information. The information may be any suitable information that may be extracted from one or more items. Exemplary information may include number of items, type of items, denomination of items, value of items, weight of items or any other information that may be included on or within the items. The information may also be determined by type of item, such as number of checks or value of cash.

The information may include condition of items, validity of items or any uncertainty about the item. The uncertainty may include an error message, a determination that an item is counterfeit, or a flagging of an item for further review. Determination that an item is counterfeit may be accomplished using any suitable means, such as a marking, chemical testing, fiber testing, optical scanning, or weight measurements. The necessary tools and components for counterfeit determination may be located inside of the FPS.

The sensor may scan each item. The sensor may detect defects, denomination, counterfeit, origination of currency, and type of item. For example, the sensor may determine that the item is a $20 denomination bill. In a further example, the sensor may determine that the item is a check. In yet a further example, the sensor may determine that the item is counterfeit, or possibly counterfeit.

The sensor may collect data. The data may be data about the item. The data may be data corresponding to the item. The data may be processed. The data may be used in substantially real-time for analytic models. The data may be used at later time for analytics.

The FPS may include a feeder network for transferring an item from the acceptor to the sensor. The feeder network may include rollers, belts, tracks, picks, motors, magnets, suction pads or any other suitable components.

The FPS may include one or more storage cartridges. The storage cartridge may receive one or more items from the sensor. The storage cartridge may be configured to store one or more of the items. The sensor may be located along a feeder network connecting the acceptor to the storage cartridge. The storage cartridge may receive one or more items from the acceptor. The feeder network may transfer the item from the acceptor to the storage cartridge.

The acceptor may receive an item. The item may be transferred from the acceptor to the sensor. The item may be transferred via the feeder network. The feeder network may transfer the item from the sensor to the storage cartridge.

The storage cartridge may include a sensor. The storage cartridge may include a floor. The floor may support one or more tangible items stored in the storage cartridge. The floor of the storage cartridge may include the sensor. The floor may be supported by one or more struts. The struts may include the sensor.

The item may be stored in the storage cartridge. The sensor may be removable from the storage cartridge. For example, the sensor may sit on top of the storage cartridge floor. The sensor may be detachable from the storage cartridge floor.

The storage cartridge may receive one or more items collected by the acceptor. The storage cartridge may be removable from the FPS. The storage cartridge may be configured to store one or more of the collected items received by the acceptor. The items may be stored in the storage cartridge until the FPS is serviced. For example, an item may be collected by the acceptor. The acceptor may transfer the item to the storage cartridge via the feeder network. The item may be stored in the storage cartridge until a pickup.

The pickup may be a transfer, transport or supply. The pickup may be a pickup of the items inside the storage cartridge. The pickup may be a pickup of the storage cartridge. The pickup may transport the items in a storage cartridge. The store cartridge may be transported to a facility.

The FPS may include a plurality of storage cartridges. Each storage cartridge may be designated to receive one or more items. Each storage cartridge may be filled in sequence until the cartridge is at capacity. For example, once the first storage cartridge is at capacity, all items may be stored in a second storage cartridge.

Each storage cartridge may be designated to receive one or more specified categories of items. For example, all attachments may be stored in a first cartridge. In another example, all items of monetary value may be stored in a second cartridge.

The FPS may be configured to transfer each unique denomination to a separate storage cartridge. The FPS may be configured to transfer each type of document to a separate storage cartridge. For example, a check may be stored in a first storage cartridge. In another example, a receipt may be stored in a second storage cartridge.

The FPS may be configured to flag one or more items. The flag may be a label, flag, tag, highlight or any other suitable identifier. The flagged items may be stored in a storage cartridge. One or more storage cartridges may be configured to only receive flagged items.

The FPS may transmit data corresponding to the flagged item. The data may include a photograph, type of item or any suitable indicator. The data may be transmitted to the financial institution.

The FPS may identify one or more flagged items. The flagged items may be identified to a financial institution. The FPS may identify the percentage of flagged items, the quantity of flagged items, the potential value of flagged items, the motivation for flagging the flagged items or any other suitable identifier.

The FPS may flag counterfeit items. The FPS may flag items that may be potentially counterfeit. The FPS may flag items to indicate a request for further review. The further review may be performed at the financial institution. The review may include more detailed processing and analysis. The FPS may flag items that do not scan properly. The FPS may flag items from which data cannot be properly extracted.

The sensor may be configured to detect unrecognizable items. The FPS may flag the items and transfer the unrecognizable items to a storage cartridge. The storage cartridge may be designated to receive flagged items. The FPS may store data corresponding to the unrecognizable items in computer-readable memory. At a point in time, the FPS may transmit the data corresponding to the unrecognizable items to the financial institution. The point in time may be a time in the immediate or near immediate future. The point in time may be any future point in time.

The flagged items may be transferred. A pickup may be scheduled to transfer the flagged items.

The tools may include a processor. The processor may process one or more items. The processor may process data associated with one or more items. The processor may communicate with one or more of the acceptor, sensor, storage cartridges, scanner or memory. The processor may be located at the client location. The processor may be located within the FPS. The processor may be located at a location of the financial institution.

The tools may be configured to transmit data. The data may be transferred using the FPS. The FPS may include a transmitter. The data may be data corresponding to one or more items. The items may be the items collected by the acceptor. The data may be any suitable data.

The data may be transmitted to any suitable party. The party may be a financial institution. The data may be transmitted to a server. The data may be transmitted to a client server. The client server may transmit data from one or FPSs to the financial institution. The client server may transmit data from one or client locations to the financial institution.

Some, all or none of the data may be transmitted to a third party. The third party may be an independent contractor or vendor. The third party may be contracted with one or both of the client and financial institution. The third party may utilize the data for logistical purposes. Based on the data, the third party may transmit data to one both of the client and the financial institution. The data may include estimated costs, arrival time, departure time, travel time or any other suitable data. For example, based on the weight of the items transmitted to a third party cash transfer service, the third party may determine the type of vehicle required for pickup. In a further example, the third party may determine a cost estimate for delivery of one or more items.

The tools may include a sorter. The processor may be configured to sort one or more items. The processor may instruct a sorter to sort the items. The sorter may be a component residing within the FPS. The items may be sorted by item type. For example, the FPS may place a financial instrument into a first group. In another example, the FPS may place an attachment into a second group.

The items may be sorted by denomination. For example, a $5 bill may be placed into a first group. In a further example, a $20 bill may be placed into a second group.

The items may be sorted using any suitable method. For example, the items may be identified using an optical scanner. The optical scanner may determine similar items based on pre-determined or pre-defined characteristics. The optical scanner may transmit the scan to the processor. The processor may instruct the sorter to place an item into a group.

The sorter may be configured to communicate with one or more of the storage cartridge, acceptor, sensor, processor or modem. The communication may be via the feeder network.

The processor may be further configured to compile a file. The file may be an image. The image may be an electronic image. The image may be a photograph. The image may be an image of each item collected or received by the FPS.

The file may a data file. The data file may be a CSV file, word processor file, or any other suitable file. The file may be one large file. The file may be a unique file for each item collected by the FPS. The file may include information extracted from an item. The file may be a folder containing one or more files.

The processor may be configured to compute a sum. The sum may be the sum of the total number of financial instruments collected by the FPS. The sum may be computed within any suitable time frame. For example, the processor may compute the number of financial instruments collected by the FPS during the present hour, day, week, month or any other suitable time frame.

The sum may be the sum of the total number of non-financial instrument items collected. For example, the sum may be the total number of attachments collected by the FPS. The sum may be the total number of all items collected by the FPS. The sum may be the total number of items collected for each denomination. The sum may be the total number of items collected for each type of item.

The processor may be further configured to calculate a value. The value may be a monetary value. The monetary value may be the monetary value of the items received by the FPS. The value may be calculated for one or more items received within a predetermined time frame. The processor may be configured to determine the denomination of each item.

The financial institution may receive data. The data may be data collected by the FPS. The data may be data transmitted via the FPS or FPS network. The FPS may transmit the data to the financial institution. The data may be transmitted to the financial institution prior to the removal of the items from the FPS. The data may be transmitted immediately upon the collection of data by the FPS. The data may originate from a client. Data may originate from a third party. The third party data may be based on data received from the client.

The FPS may transmit the sum of the number of the items. The FPS may transmit the monetary value of the items. The FPS may transmit the quantity of items for each denomination.

The financial institution may process the data. The financial institution may configure the FPS to process the data onsite. The FPS may contact one or more offsite networks or servers to contribute to data processing. The FPS may process the data entirely onsite.

The financial institution may process the data models. The financial institution may compute one or data models. The model may be computed based on data. The model may be a data structure. The model may incorporate data from one or more of the client, financial institution, third party or any other suitable data. The data may be the data received by the financial institution from a client. The model may be a forecast. The model may be an analytical model. The analytical model may include data analysis. The model may be a relational model. The model may be a statistical model.

The relational model may forecast data. The relational model may be based on the relationship or correlation between two or more variables. The forecast may be a prediction of results.

The model may be used to make one or more predictions. The prediction may be based on the relationship or correlation between two or more data elements. The data elements may be variables. For example, based on both the time of day and the expected travel time to transfer a storage cartridge from the client to a processing center, the model may predict one or more preferred times for a cash replenishment delivery.

Each forecast may be unique to a specific client. The data model may be used to forecast client needs. The data model may be used to forecast a result, output, consequence, outcome or effect. The data model may be used to forecast client requirements or preferences. The data model may be used to forecast predicted client usage of additional services or accounts offered by the financial institution. The data model may be used to forecast preferred or optimal times for interactions between the client, financial institution and/or third parties. For example, the data model may predict an outcome based on input of client data, financial institution data and/or data received from a cash handling service. In a further example, the data model may determine an optimal daily cash delivery time for a client using a specified cash handling service. In yet a further example, the optimal time may be a time convenient for all three parties, such as a time at which the client is able to devote required manpower to receiving and processing the cash.

The data model may be used to forecast receipts. The receipts may be expected receipts or deliveries for any suitable time frame. The receipts may be forecasted based on items received by the FPS.

One or more data models may be used to forecast client cash-flow. The data model may forecast client cash-flow at different points in time. The data model may be used to forecast one or more deficiencies. The deficiency may be a client deficiency. The forecast may be calculated in real-time or substantially real-time. The forecast may be a deficiency predicted to occur in the immediate future, or at some point later in time. The deficiency may be an expected deficiency. The deficiency may be forecast based on one or more items. The items may be the items received by the FPS.

The deficiency may be forecast based on collected data. The collected data may be used to calculate data models. The data may be historical data. The data may be current data.

The data may be received via a live stream or feed. The data may continuously update. The updates may occur as a result of the live stream or feed. The update in data may result in one or more updates to forecast models.

It should be noted that preferably all forecasts, predictions, estimates, models or analysis may be updated. The update may be in real-time. The update may be a batch update at pre-determined intervals. The update may occur continuously based on real-time information. The updates may be transmitted to one or more parties in real time, or any suitable time interval.

The data may incorporate client data. The data may incorporate usage data, client history, client account history, and client trends.

For example, the data may include client usage of financial instruments. The usage may be a total usage, an average usage, median usage, or any other statistical variation. The usage may be usage of financial instrument by type. The usage may be usage of financial instrument by denomination. The usage may be a calculated quantity. The usage may be determined for any suitable interval of time, any period of time, or any other suitable interval.

The quantity of usage, denominations, or value may be a daily quantity. The daily quantity may be daily client requirements for a financial instrument. The daily quantity may be the quantity of financial instruments processed by the client. The quantity may be the quantity of cash on hand needed by the client. The quantity of cash on hand may be determined for each denomination.

The client data may include temporal data. The temporal data may be average temporal data. The temporal data may identify one or more points in time. The time may be a preferred delivery time. The time may be a preferred pickup time. The delivery may be a delivery of financial instruments. The time may be a time of peak client consumption of cash on hand.

Temporal, usage, quantity or other suitable forecasts, predictions, or estimates may be determined for any suitably identified segment. For example, forecasts of quantity deficiencies may be divided into any suitable time frame, such as hourly forecasts, or AM and PM forecasts. In another example, forecasts of usage may be divided into forecasts of usage type (e.g., checks), forecast of quantity of usage (e.g., number of checks used) or forecast of usage in a time frame (e.g., checks processed in the morning).

A preferred delivery time may be identified for each denomination. A preferred pickup time or delivery time may be determined based on convenience to the client. The preferred time may identify an average time of day when a delivery is favored. The preferred time may identify an average time of day when a pickup is favored.

Exemplary information for identifying a preferred time may include time of day when the client requires replenishment of cash on hand, client usage, day of week, client convenience, client staffing, or any other suitable information.

The data may incorporate non-client data, such as geographic location data, traffic patterns, weather patterns, roads, third party data, seasonal information, or any other suitable data.

The data may incorporate financial institution data. The financial institution data may include capacity of processing center, location of processing center, distance to processing center, hours of service, average backlog, and any other suitable data.

The data may incorporate multiple variables such as the preferences of multiple parties, historical results, cost containment and any other suitable variables.

The forecast may be transmitted to the client. The transmission may be in real time. The forecast may be transmitted to any suitable client device. The forecast may be transmitted to the FPS. The FPS may include a display. The display may display the forecast.

It should be noted that any communication between the client, financial institution and/or third parties may occur using one or more of a proprietary network, internal network, intranet, third party processing platform, financial institution interface, messaging device or platform, application, e-mail or any other suitable communications system.

The client may configure one or more automated communication preferences. The financial institution may configure one or more automated communication preferences. For example, the financial institution may transmit automatic updates or queries to the client. The updates or queries may be triggered upon the client reaching a threshold. The threshold may be a predetermined threshold. In a further example, the client may configure a threshold amount. The threshold amount may be any suitable monetary value, such as $10,000. The client may request, or the financial institution may provide, an automated communication asking the client if the client would like to request more cash on hand.

The threshold value may be determined based on prior occurrences. For example, a query to the client may indicate that, in the majority of instances where the client deposited an amount exceeding $500 into the FPS, a delivery of $1 bill denominations has been requested. Therefore, in a further example, the query may ask the client if the client would like to request a delivery of $1 bill denominations.

The forecast may not be transmitted to the client. For example, the financial institution may utilize the forecast for internal processing improvements. In a further example, the financial institution may utilize the forecast to determine preferred institution processing times.

The forecast may analyze trends. The trends may be client trends. The client trends may be client usage trends. The client usage trends may be previous client usage trends. The usage trends may be a client's trend of previous usage of cash on hand. The usage may be total cash on hand usage. The usage may be cash on hand determined for each denomination. The usage may be usage within a specified time frame.

The forecast may be calculated based on an evaluation of current usage. The current usage may be a trend. The current usage may be the client's current usage. The current usage may be the client's usage for the current day. The usage may be usage of cash on hand.

The forecast may be calculated using a metric. The forecast may be calculated using an algorithm. The forecast may predict one or more future deficiencies. The deficiency may be a client deficiency. The client deficiency may be a deficiency for cash on hand. The cash on hand deficiency may be a deficiency for total cash on hand by monetary value. The deficiency may be determined for each denomination. The deficiency may be a financial institution deficiency. The future deficiency may be a predicted deficiency for the current day, next day, week, or any other suitable time frame.

The forecast may be used to modify a schedule. The forecast may be used to suggest a modification to a schedule. The schedule may be a delivery schedule. The schedule may be the delivery schedule for one or more financial instruments. The financial instruments may be delivered by a third party. The third party may be any suitable cash handling or delivery service. The financial instruments may be delivered by the financial institution. The financial instruments may be delivered to the client.

The forecast may be used to make a recommendation. The recommendation may include any suitable recommendation. For example, the recommendation may recommend, based on a prediction, procedures to increase efficiency.

The forecast may be used to recommend a modified schedule. The modified schedule may be a modified delivery schedule. The modified schedule may be a modified pickup schedule. The forecast may be used to recommend a schedule for financial instrument replenishment. The recommendation may include different recommendations for each denomination. The forecast may be used to recommend an immediate cash transfer.

The forecast may be used to calculate an optimal delivery schedule. The forecast may be used to predict a preferred delivery schedule. The forecast may be used to calculate delivery options. The delivery options may include one or more estimates. The estimate may be a time estimate. The time estimate may estimate average time of transit for transfers, average processing time, average time for an account to reflect deposits, and any other suitable time estimate.

The tool may calculate an estimated arrival time of one or more items. The financial institution may calculate an estimated arrival time of the items. The arrival may be the arrival of the items at a financial institution. The arrival may be the arrival time at a stop or checkpoint. The financial institution may be a branch, sorting center, processing center, regional processing center, processing facility, sorting facility, contracted third-party facility or any other suitable facility.

The tool may forecast or predict arrival time. The arrival time may be calculated based on the time of departure of the items from the client. The arrival time may be calculated using any suitable historical or current conditions.

The tool may include a tracking feature. The tool may be linked, connected to, or otherwise in contact with a tracking feature or tracking apparatus. The tool may receive tracking information. The client may receive tracking information via the tool. The financial institution, or a third party, may receive tracking information via the tool. The tool may include a display. The display may display tracking information. The client may receive one or more tracking information updates. The updates may be in real-time or substantially real-time. The client may customize preferences for updating tracking information.

The client may retrieve tracking information. The tracking information may be transmitted to the client. The tracking information may be transmitted to a client device. The tracking information may be retrieved by the client. The tracking information may be available to the client by accessing a log-in screen. The log-in screen may be a user interface. The tracking information may be transmitted to the client's email.

The tracking information may be linked to a proprietary tracking feed. The feed may include information from the financial institution, client and/or any suitable third parties. The feed may also display forecast information, time estimates, item processing information and any other suitable information.

The tracking information may be calculated using information input by one or more of the client, financial institution and third party.

The tracking information may include a barcode. The barcode may be generated. The barcode may be unique barcode. The barcode may identify a specific container. The container may be any suitable container, such as a bag, sack, satchel, item, package, receptacle or storage cartridge. The barcode may be generated by the FPS, client, third-party, delivery service, or financial institution. The barcode may be printed. The printer may be located within the FPS. The FPS may print a barcode. The FPS may affix the barcode to a storage container. The storage container may be removable from the FPS.

The barcode may be scannable. The barcode may be scanned to view information. When scanned, the barcode may retrieve information. The information may include information corresponding to one or more items. The barcode may be linked to the information.

The barcode may be scanned to update information. For example, the barcode may be affixed to a container. The barcode may be scanned at one or more points in transit, such as a stop, intermediate or final processing facility, or checkpoint. In response to the scanning, the tool may determine the current location of the container. The tool may transmit the current location of the container to the client. The tool may transmit the current location of the container to the financial institution. In response to the scanning, the tool may log any suitable data associated with the container. For example, the tool may log the location and time of the barcode scan. The tool may log an identifier associated with the scanner, such as a scanner ID, log-in, signature, or other suitable identifier.

The tool may update one or more forecasts based on the scan. The update may be a recalculation. For example, the tool may update the estimated time of arrival of a container at a processing center. In a further example, the tool may update the estimated time that the transferred funds are expected to clear. The expected time of clearance may be used to predict fund availability to the client. The FPS may transmit the updated forecasts to any suitable party using any suitable method.

The barcode may correspond to, cause to retrieve, or be linked to, one or more data records. The barcode may be linked to data corresponding to the items in the container. The barcode may be scanned to retrieve all data corresponding to the items in the container. For example, the barcode may be scanned upon arrival at the financial institution. Upon scanning the barcode, the financial institution may retrieve information about the items. The information may be information corresponding to the initial processing of the items at the client location. For example, the information may include scanned images of the items upon being collected by the FPS. The information may include any other suitable information determined via the FPS sensor, such as weight, denomination, value, condition code, error, or error percentage.

The tool may include a first FPS and a second FPS. The first FPS and second FPS may be operationally identical. The first FPS may be located at a client location. The second FPS may be located at a financial institution.

Upon receiving the items, the financial institution may insert the items into the second FPS. The second FPS may scan the barcode. The FPS may include a barcode scanner. The barcode scanner may be an internal component of the FPS. The FPS may determine if the items received at the financial institution are identical to the items inserted into the first FPS at the client location. The second FPS may log any variations between the record of the scan at the first FPS and the current scan. The second FPS may determine one or more variations of total number of records, quantity by type, quantity by denomination, total monetary value or any other suitable record.

The historical data may include previous cash transfer data. The data may correspond to a time. The time may be an amount of time. The time may be an average time. The time may be a processing time. The time may be an amount of time to process a document.

Condition data may include current or past traffic conditions, weather conditions, processing center volume, time of day, current item location, number of non-cash items, number of cash items, number of flagged items or any other suitable condition.

The location may be determined using a tag or locator. The tag may be a geographic location tag.

The financial institution may determine a client error rate. The error rate may be a percentage. The error rate may be a score. The error rate may indicate a quantity of client success utilizing the FPS. For example, the error rate of Client "Q" may be 1.2%, indicating that Client Q successfully inputs 98.8% of items into the FPS. In a further example, clients may be assigned a score using any suitable metric. In yet a further example, a client with an error score less than 1% may be given a rating of "4" out of 5, with 5 being the highest possible score. In yet a further example, a client with a rating of "4" may be offered a discount, such as a 5% reduction on deposit processing costs, relative to those clients with a rating of "3," or any other suitable promotion.

The financial institution may generate a tiered scoring system. Clients scoring within a certain tier may be granted certain value-added services, such as discounts, offers, premium features or any other suitable service. Clients meeting and maintaining certain thresholds may qualify for certain account features. For example, clients achieving and maintaining a 0% error rate for a certain pre-determined threshold time period may be offered provisional credit. The provisional credit may be a temporary credit. The provisional credit may be transferred to permanent credit upon clearance of the items by the financial institution.

The tool may include a tracking device. The tracking device may provide tracking information. The tracking device may generate a barcode. The barcode may correspond to one or more items. The barcode may correspond to data. The barcode may correspond to one or more containers. The barcode may be affixed to, attached to, or otherwise associated with the container. The barcode may correspond to data associated with one or more items. The barcode may correspond to data associated with one or more containers.

The tool may generate a barcode. The FPS may generate a barcode. The tracking system may include a barcode generator. The barcode generator may reside within the FPS. The tool may print the barcode. The tool may contain a printer. The printer may reside within the FPS. The printer may be associated with the tracking system.

The barcode may be affixed to one or more items. The barcode may be affixed to a container or any other suitable object. The barcode may be affixed to a package. The package may contain one or more items.

The barcode may be scanned. Upon scanning, the barcode may retrieve data. The data may be retrieved by the scanner. The data may be retrieved by any suitable device. The device may not be physically in contact with the scanner.

The barcode may be associated with data. The data may be data corresponding to one or more items. The data may be any data corresponding to an item. For example, the barcode may retrieve the weight of the item when it was first received by the FPS. In a further example, the barcode may retrieve a photograph of the item upon the initial collection of the item by the FPS.

The tool may transmit tracking information. The tracking information may be transmitted via the FPS. The tracking information may be transmitted to a financial institution. The tracking information may be transmitted to a client. The tracking information may be transmitted to a third party.

The tracking information may include a package identifier. The tracking information may include any suitable tracking information. The tracking information may include one or more scanning times, item weight, package weight, estimated time of delivery, estimated time remaining until delivery, and estimated cost of transport.

The tool may further include a scanner. The scanner may scan the barcode. The barcode may link to data. The barcode may retrieve data. After the barcode is scanned, the tool may retrieve data. The data may be associated with the barcode. The data may correspond to an item. The item may be an item in a package.

The tool may scan the barcode when one or more items are received. The barcode may be scanned immediately upon receiving the one or items in the FPS. The barcode scan may create a log for the one or more items. The log may be updated.

The barcode scan may generate data. The data may be processed by the FPS. The data may be processed by a client server. The data may be processed by a financial institution server. The data may be processed by a third party server.

The data may include any suitable data. The data may include temporal data. The temporal data may include a time when the item is received by the FPS. The temporal data may include a time at which the item is picked up or delivered. The temporal data may include estimates. The estimate may be an estimated processing time, estimated arrival time, estimated duration of transit or estimated time until funds clear.

The data may include quantity data. The quantity data may include any suitable number or value. The data may include geographic data. The geographic data may identify the location of the item.

The barcode may be scanned at one or more locations. The barcode may be scanned at a first location. The first location may be a client location. The first location may be a financial institution. The first location may be the location of an FPS.

The barcode may be scanned at a second location. The second location may be any suitable location. The barcode may be scanned using any suitable scanner. The barcode may be scanned at a stop. The stop may be any location prior to arrival at a final destination. The stop may be an interim stop, layover, pickup, drop off, checkpoint, or any other suitable location for updating a location. The stop may be a stop during transfer of the financial instruments.

The barcode scan may be configured to retrieve data. The barcode scan may retrieve the data when the barcode is scanned at the second location. The data may be associated with the barcode. The data may be data extracted or determined at the first location.

The tool may be configured to transmit an update. The update may be a status update. The update may be an updated estimate, prediction or forecast. The update may be a plurality of updates. The update may be transmitted to a client. The update may be transmitted to a financial institution. The update may be transmitted to a third party.

The update may be a first update. The first update may be transmitted to a first party. The first update may correspond to a first information set. The first information set may include any suitable information. The update may be a second update. The second update may be transmitted to the first party. The second update may be transmitted to a second party. The second update may correspond to a second information set. The second information set may include any suitable information.

The tool may transmit data. The data may be transmitted from the first location to the second location. The data may be transmitted from a first FPS to a second FPS. The first FPS may be located at the first location. The second FPS may be located at the second location.

The transmitted data may correspond to an item. The transmitted data may include tracking information.

The tool may receive an item. The item may be received at a second location. The item may be a physical item. The item may be delivered. The delivery may be a delivery using a third party cash transfer service.

The tool may compare the data transmitted from the first location to the characteristics of the physical item received at the second location. The tool may determine if the transmitted data corresponds to the item received.

The tool may determine if the total number of items received at the second location is equal to the total number of items transmitted from the first location. The tool may determine if the total monetary value of items received at the second location is equal to the total value of items transmitted from the first location. The tool may determine if the denominations of items received at the second location are equal to the denominations of items transmitted from the first location.

The tool may identify one or more inconsistencies. The inconsistencies may be between data transmitted from the first location and items received at the second location.

The tool may retrieve electronic images. The images may be images of an item. The image may be an image of the item captured at the first location. The tool may compare the electronic image of the item to the physical item. The physical item may be the item received at the second location.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage encoded media having computer-readable program code, or instructions, embodied in or on the storage encoded media. Any suitable computer readable storage encoded media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting encoded media such as metal wires, optical fibers, and/or wireless transmission encoded media (e.g., air and/or space).

Processes in accordance with the principles of the invention may include one or more features of the processes illustrated in FIGS. 1 and 5-11. For the sake of illustration, the steps of the processes illustrated in FIGS. 1 and 5-11 will be described as being performed by a "system." The "system" may include one or more of the features of the apparatus that are shown or described herein and/or any other suitable device or approach. The "system" may be provided by an entity. The entity may be an individual, an entity or any other suitable entity.

Illustrative information that is exchanged with the system may be transmitted and displayed using any suitable markup language under any suitable protocol, such as those based on JAVA, COCOA, XML or any other suitable and languages or protocols.

FIG. 1 shows a schematic diagram of exemplary system 100 for forecasting and validating data.

System 100 may include client 101. Client 101 may utilize system 100. Client 101 may utilize system 100 in communication with one or more of financial institution 107, third-party 121 and third-party 123.

Client 101 may be any suitable entity, such as a retail, commercial or industrial entity. Client 101 may be one of a plurality of clients. Client 101 may operate one or more client locations. For example, client 101 may operate a first branch in a first location and a second branch in a second location. Client 101 may be any suitable client of a financial institution. Client 101 may be located in a remote location.

Client 101 may be a client of a financial institution. The financial institution may operate one or both of institution 107. The financial institution may be any suitable financial institution, such as a branch or processing center.

Institution 107 may be operated by a third-party or any suitable vendor or contractor. Institution 107 may be a processing center. Institution 107 may be a sorting center. Institution 107 may be operated by a cash delivery or cash transfer service. Institution 107 may be operated by an armored car provider.

System 100 may include Funds Processing System ("FPS") 103. FPS 103 may be the property of client 101. FPS 103 may be the property of financial institution. FPS 103 may be the property of institution 107. FPS 103 may be placed at client 101 by the financial institution or by a third-party.

FPS 103 may be located in any suitable area within client 101. For example, FPS 103 may be located in a designated room, such as room 105. Alternatively, FPS 103 may be located in proximity to non-FPS items.

FPS 103 may receive one or more items. The item may be one or more financial instruments. The item may be one or more attachments.

FPS 103 may process the items. FPS 103 may generate data. The data may correspond to one or more items. The data may correspond to one or more attributes of the items. FPS 103 may record or log one or attributes of the items. Exemplary attributes may include weight, dimensions, value, quantity, type or any other suitable attribute.

FPS 103 may store the items. The items may be stored until a pickup. The items may be stored within FPS 103. The items may be stored in a container adjacent or in proximity to FPS 103.

FPS 103 may store the data. The data may be stored in computer-readable memory. FPS 103 may transmit the data. The data may be transmitted immediately upon creation of the data. For example, immediately after the weight of a bill is determined, the weight may be transmitted by the FPS. The weight may be stored by the FPS. The storage of the weight may be for a transmission at a later time.

The data may be cross-referenced with one or more items. For example, data corresponding to a check may include a unique identifier. In a further example, the physical check may be associated with a unique identifier, to allow cross-referencing and retrieval.

FPS 103 may transmit the data over a communication network. The communication may be any suitable communication network. Illustrative data flow of the communication network may include flow 109. Flow 109 shows the transmission of data from the FPS using the communication network. The data may continue the transmission via flow 111. Flow 111 shows the arrival of the transmitted data. The transmitted data may arrive at institution 107. The data may be transmitted directly from FPS 103 to institution 107.

The data may be processed substantially entirely at FPS 103. FPS 103 may process analytical models and forecasts associated with the data. The data may be processed at a point along the path of transmission. For example, the data may be transmitted by flow 109 to a server. The server may process the data. The data may be processed by the financial institution.

The data may be used to generate forecast 113. Forecast 113 may be generated at FPS 103. Forecast 113 may be generated by the financial institution. The data may be generated institution 107. Forecast 113 may be generated at FPS 103 using institution software, hardware or networking. Forecast 113 may be generated at FPS 103 using pre-configured programming. The pre-configured programming may be programmed by institution 107.

System 100 may include illustrative flows 117 and 119. Flow 117 is an illustrative flow of one or more items. Flow 117 may be the physical transfer of the items.

Flow 117 may be represented by vehicle 123. Vehicle 123 may be operated by a financial institution. Vehicle 123 may be operated by a contracted third-party. Vehicle 123 may transfer physical items from client 101. Vehicle 123 may pick up items at client 101. Vehicle 123 may transfer the items to institution 107. Institution 107 may be operated by a financial institution. Institution 107 may be operated by a third-party.

Vehicle 123 may deliver the items to institution 107. The items may be processed at institution 107. Institution 107 may include a second FPS. Institution 107 may determine if the items are identical or substantially identical to the data received via flows 109 and 111. At least a portion of this determination may be accomplished using the second FPS. Institution 107 may determine inconsistencies or differences between the data received via flows 109 and 111 and the items received via vehicle 123.

Data corresponding to the inconsistencies may be analyzed. The data corresponding to the inconsistencies may be stored in computer-readable memory for later review. The items associated with the inconsistencies may be analyzed. Characteristics of the physical items associated with the data may be analyzed. Institution 107 may implement specified review procedures for items associated with inconsistencies. Institution 107 may store the items.

Vehicle 123 may transfer the items from institution 107 to institution 125. Institution 125 may store the items. Institution 125 may process the items. Institution 125 may include an FPS. Institution 125 may determine if the items are identical or substantially identical to the data transmitted via flows 109 and 111. Institution 125 may determine this using the FPS. Institution 125 may determine inconsistencies between the data received via flows 109 and 111 and the items received via vehicle 123.

Institution 125 may receive data. The data may be received via flow 127. The data may be received from Institution 107. The data may be identical to the data transmitted from client 101 via flows 109 and 111. The data may be different than the data transmitted from client 101 via flows 109 and 111. For example, institution 125 may receive data corresponding to the items. The data may include data not included in the data transmitted via flows 109 and 111.

Flow 119 may be represented by vehicle 121. Vehicle 121 may be substantially identical to vehicle 123. Vehicle may illustrate the movement of items. The movement may be the movement of financial instruments. The financial instrument movement may be a delivery of financial instruments to client 101.

Figure 2:
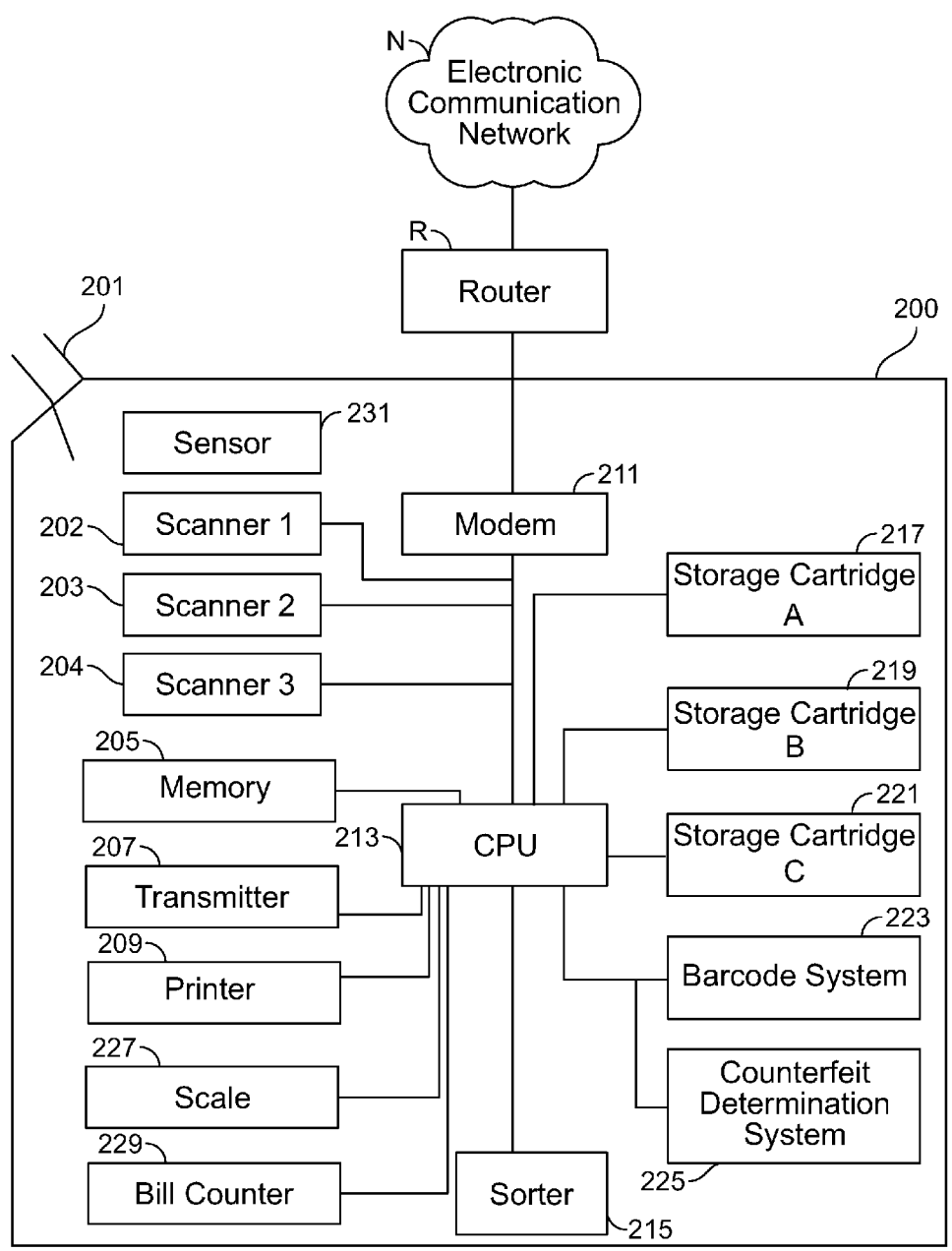
FIG. 2 shows illustrative apparatus in accordance with the principles of the invention.

FIG. 2 shows illustrative apparatus 200. Apparatus 200 may be a Funds Processing System ("FPS"). FPS 200 may be a kiosk, terminal, standalone device, self-service terminal or any other suitable apparatus. FPS 200 may be incorporated into system 100, discussed above. FPS 200 may be one of a plurality of FPSs operating within system 100.

FPS 200 may be in communication with Electronic Communication Network N. The communication may be routed through Router R.

FPS 200 may include feeder 201. Feeder 201 may receive one or more items. Feeder 201 may include a mechanical gate. Feeder 201 may be an opening. Feeder 201 may include a conveyer belt.

Feeder 201 may be accessible by one or more individuals. Individual may feed or drop one or more items into feeder 201. Feeder 201 may transfer the items via a feeder network (not shown).

The feeder network may transfer the items to a sensor 231. Sensor 231 may be any suitable sensor. Sensor 231 may be or include a scale, scanner, camera, bill counter, or sorter. Sensor 231 may determine one or more attributes of an item received via feeder 201. Sensor 231 may scan an item to determine an attribute.

Sensor 231 may transmit information to CPU 213. CPU 213 may instruct the feeder network to transfer the item. CPU 213 may determine a destination for the item. The destination may be based on information received from sensor 231. CPU 213 may instruct the feeder network to transfer the item one or more of scanners 202, 203 and 204.

The feeder network may transfer the items to one or more of scanner 202, scanner 203 and scanner 204. Scanners 202, 203 and 204 may be located along the feeder network. One or more of scanners 202, 203 and 204 may receive an item via the feeder network.

It should be noted that each of scanners 202, 203 and 204 may receive the items via the feeder network directly from feeder 201. Alternatively, each of scanners 202, 203 and 204 may receive the items via the feeder network from sensor 231.

Each of scanners 202, 203 and 204 may be designated to scan one or more items. Each scanner may be designated to scan one or more categories, types or denominations of items. For example, scanner 202 may be designated to scan checks. In a further example, scanners 202, 203 and 204 may all be configured to scan all items.

Scanners 202, 203 and 204 may transmit information to CPU 213. The information may be any suitable information. The information may be scans of one or more items. The scans may be processed to determine further attributes of the items. The scans may be processed by CPU 213.

CPU 213 may be associated, and in communication, with modem 211. Modem 211 may communicate with Router R. CPU 213 may be associated with, and/or in communication with, one or more of memory 205 and transmitter 207. CPU 213 may store data in memory 205. CPU 213 may transmit data using transmitter 207 over electronic communication network N via modem 211 and router R.

CPU 213 may instruct the feeder network to transfer one or more items from one or more of scanners 202, 203 and 204 to sorter 215. Sorter 215 may be part of sensor 231. Sorter 215 may exist independent of sensor 231. Sorter 215 may sort the items using any suitable sorting methods or systems. Sorter 215 may sort the items based on data received from CPU 213. The data may be data received from one or more of sensor 231 and scanners 202, 203 and 204.

The feeder network of FPS 200 may be complex and extensive. Thus, the flow and direction of items may be altered or customized. Therefore, all of the components within FPS 200 may be capable of communicating with one another. All of the components within FPS 200 may be capable of transferring one or more items via the feeder network to one another.

For example, sorter 215 may transfer items directly to one or more of storage cartridges 217, 219 and 221. Storage cartridges 217, 219 and 221 may be identical. Storage cartridges 217, 219 and 221 may be removable from FPS 200. Storage cartridges 217, 219 and 221 may each be configured to store different items. The items may be differentiated using any suitable method.

In another example, sorter 215 may transfer one or more items to one or both of scale 227 and bill counter 229. Scale 227 may determine weights of one or more items. Counter 229 may determine the quantity of one or more items.

In a further example, scanners 202, 203 and 204 or sensor 231, may transfer one or more items directly to storage cartridges 217, 219 and 221.

FPS 200 may further include printer 209, barcode system 223 and counterfeit determination system 225.

Printer 209 may be a part of barcode system 223. Printer 209 may print one or more barcodes. Printer 209 may print an identifier. The identifier may be stored in a storage cartridge. The identifier may be stored with one or more items. For example, printer 209 may print an identifier. The identifier may correspond to a check. The identifier may be stored in storage cartridge 217 with the check. This may allow for ease of retrieval of data associated with the check.

Barcode system 223 may include a barcode generator, printer, and other suitable components. Barcode system 223 may include a tracking system (not shown). Barcode system 223 may be a component of a tracking system.

Barcode system 223 may generate a unique barcode. The barcode may be printed. The printed barcode may be affixed to one or more of storage cartridges 217, 219 and 221. The generating of a barcode may generate an associated file. The file may be stored in memory 205.

Counterfeit determination system 225 may receive one or more items. Counterfeit determination system 225 may receive all items received via feeder 201. Counterfeit determination system 225 may receive selected items. The items may be items selected for further review. The selection may be based upon an inadequate or indeterminable scan, a weight, or any other suitable reason.

Counterfeit determination system 225 may include any suitable counterfeit determination components, such as enhanced scanners, chemical analysis equipment, fiber analysis, or any other suitable determination mechanisms.

Figure 3:
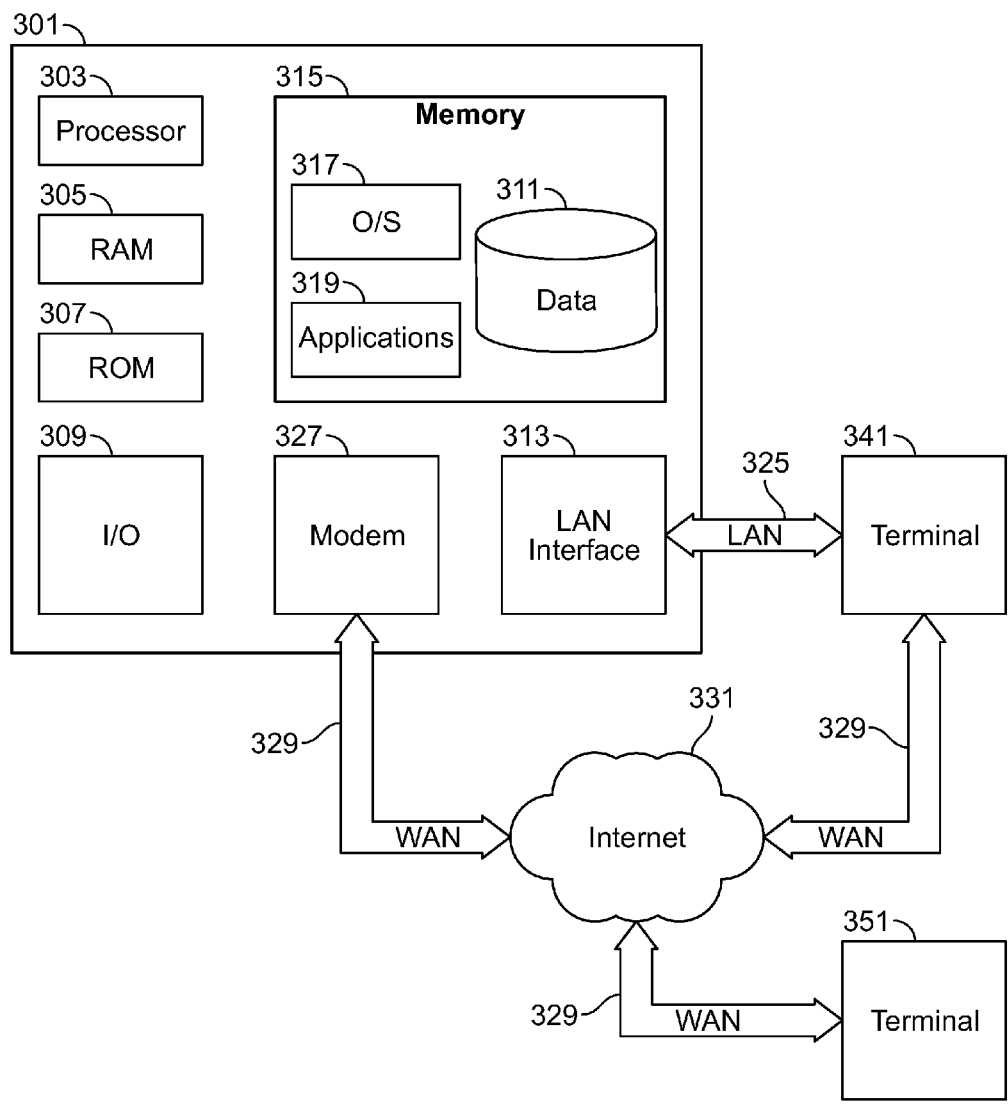
FIG. 3 shows other illustrative apparatus in accordance with the principles of the invention.

FIG. 3 may include system 300. System 300 may share one or more features with the apparatus shown in FIG. 2. System 300 illustrates a computing device 301 (alternatively referred to herein as a "server") that may be used according to an illustrative embodiment of the invention. The computer server 301 may have a processor 303 for controlling overall operation of the server and its associated components, including RAM 305, ROM 307, input/output ("I/O") module 309, and memory 315.

I/O module 309 may include a microphone, keypad, touch screen and/or stylus through which a user of device 201 may provide input, and may also include one or more of a speaker for providing audio output and a video display device for providing textual, audiovisual and/or graphical output. Software may be stored within memory 315 and/or other storage (not shown) to provide instructions to processor 303 for enabling server 301 to perform various functions. For example, memory 315 may store software used by server 301, such as an operating system 317, application programs 319, and an associated database 311. Alternatively, some or all of server 301 computer executable instructions may be embodied in hardware or firmware (not shown).

Server 301 may operate in a networked environment supporting connections to one or more remote computers, such as terminals 341 and 351. Terminals 341 and 351 may be personal computers or servers that include many or all of the elements described above relative to server 301. The network connections depicted in FIG. 3 include a local area network (LAN) 325 and a wide area network (WAN) 329, but may also include other networks. When used in a LAN networking environment, computer 301 is connected to LAN 325 through a network interface or adapter 313. When used in a WAN networking environment, server 301 may include a modem 327 or other means for establishing communications over WAN 329, such as Internet 331.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 319, which may be used by server 301, may include computer executable instructions for invoking user functionality related to communication, such as email, short message service (SMS), and voice input and speech recognition applications.

Computing device 301 and/or terminals 341 or 351 may also be mobile terminals including various other components, such as a battery, speaker, and antennas (not shown). Terminal 351 and/or terminal 341 may be portable devices such as a laptop, tablet, smartphone or any other suitable device for storing, transmitting and/or transporting relevant information.

Any information described above in connection with database 311, and any other suitable information, may be stored in memory 315. One or more of applications 319 may include one or more algorithms that may be used to analyze deposit reporting, analyze reconciliation of deposit reporting, process deposits, reconcile deposit reporting, and/or any other suitable tasks.

Figure 4:
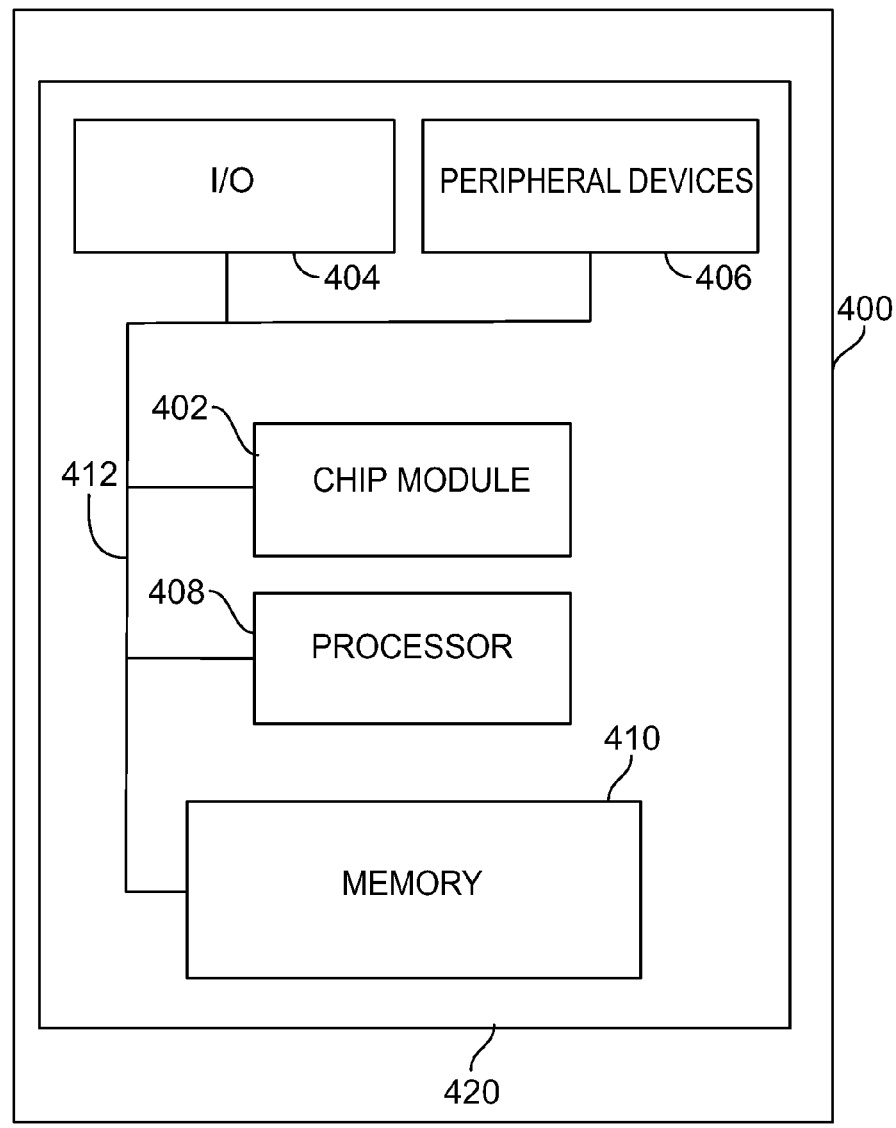
FIG. 4 shows still other illustrative apparatus in accordance with the principles of the invention.

FIG. 4 shows an illustrative apparatus that may be configured in accordance with the principles of the invention.

FIG. 4 shows illustrative apparatus 400. Apparatus 400 may share one or more features with a computing machine. Apparatus 400 may be included in apparatus shown in FIG. 3 and/or FIG. 2. Apparatus 400 may include chip module 402, which may include one or more integrated circuits, and which may include logic configured to perform any other suitable logical operations.

Apparatus 400 may include one or more of the following components: I/O circuitry 404, which may include the transmitter device and the receiver device and may interface with fiber optic cable, coaxial cable, telephone lines, wireless devices, PHY layer hardware, a keypad/display control device or any other suitable encoded media or devices; peripheral devices 406, which may include counter timers, real-time timers, power-on reset generators or any other suitable peripheral devices; logical processing device 408, which may compute data structural information, structural parameters of the data, quantify indicies; and machine-readable memory 410.

Machine-readable memory 410 may be configured to store in machine-readable data structures: data lineage information; data lineage, technical data elements; data elements; business elements; identifiers; associations; relationships; and any other suitable information or data structures.

Components 402, 404, 406, 408 and 410 may be coupled together by a system bus or other interconnections 412 and may be present on one or more circuit boards such as 420. In some embodiments, the components may be integrated into a single silicon-based chip.

It will be appreciated that software components including programs and data may, if desired, be implemented in ROM (read only memory) form, including CD-ROMs, EPROMs and EEPROMs, or may be stored in any other suitable computer-readable medium such as but not limited to discs of various kinds, cards of various kinds and RAMs. Components described herein as software may, alternatively and/or additionally, be implemented wholly or partly in hardware, if desired, using conventional techniques.

Various signals representing information described herein may be transferred between a source and a destination in the form of electromagnetic waves traveling through signal-conducting encoded media such as metal wires, optical fibers, and/or wireless transmission encoded media (e.g., air and/or space).

Apparatus 400 may operate in a networked environment supporting connections to one or more remote computers via a local area network (LAN), a wide area network (WAN), or other suitable networks. When used in a LAN networking environment, apparatus 400 may be connected to the LAN through a network interface or adapter in I/O circuitry 404. When used in a WAN networking environment, apparatus 400 may include a modem or other means (not shown) for establishing communications over the WAN. It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to operate logical processing device 408, for example over the Internet.

Apparatus 400 may be included in numerous general purpose or special purpose computing system environments or configurations. Examples of well-known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, tablets, programmable consumer electronics, network PCs, minicomputers, mainframe computers, distributed computing environments that include any of the above systems or devices, and the like.

Figure 5:
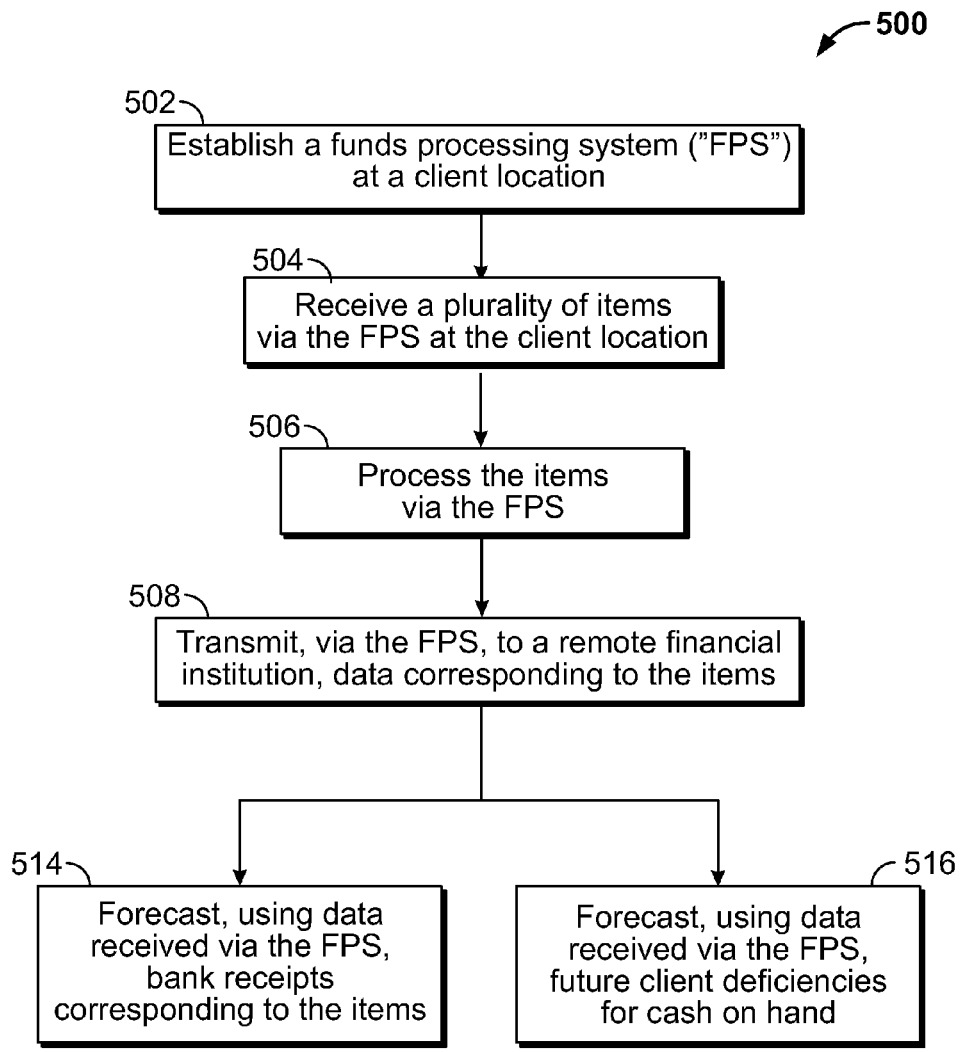
FIG. 5 shows illustrative steps of a process in accordance with the principles of the invention.

FIG. 5 shows illustrative process 500. Process 500 may begin at step 502.

At step 502, the system may establish an FPS. The FPS may be established by a client, financial institution or third party. The FPS may be established at a client location. The client location may be a remote client location. The client location may be remote from one or more financial institutions or processing centers.

At step 504, the system may receive a plurality of items. The items may be received via the FPS established at step 502. The FPS may be at the client location.

At step 506, the system may process the items received via the FPS. The processing may include one or more aspects described in FIG. 2, as performed by FPS 200.

At step 508, the system may transmit data. The data may be transmitted via the FPS. The data may correspond to one or more items received at step 504 and/or processed at step 506. The data may be transmitted to a financial institution. The financial institution may be located at a location remote from the client.

The system may continue to one of steps 514 and 516. At step 514, the system may forecast information. The forecasted information may be determined based on data. The data may be the data discussed in steps 504-508. The data may be data received via the FPS. The data may include external data. The external data may include any suitable data useful for forecasting information. The forecast may predict receipts. The receipts may be bank receipts. The bank receipts may correspond to one or more of the items in steps 504-508.

At step 516, the system may forecast information. The forecast information may be determined based on data, such as the data received via the FPS. The data may be external data. The forecast may predict one or more deficiencies. The deficiency may be a client deficiency. The client deficiency may be a deficiency of cash on hand.

Figure 6:
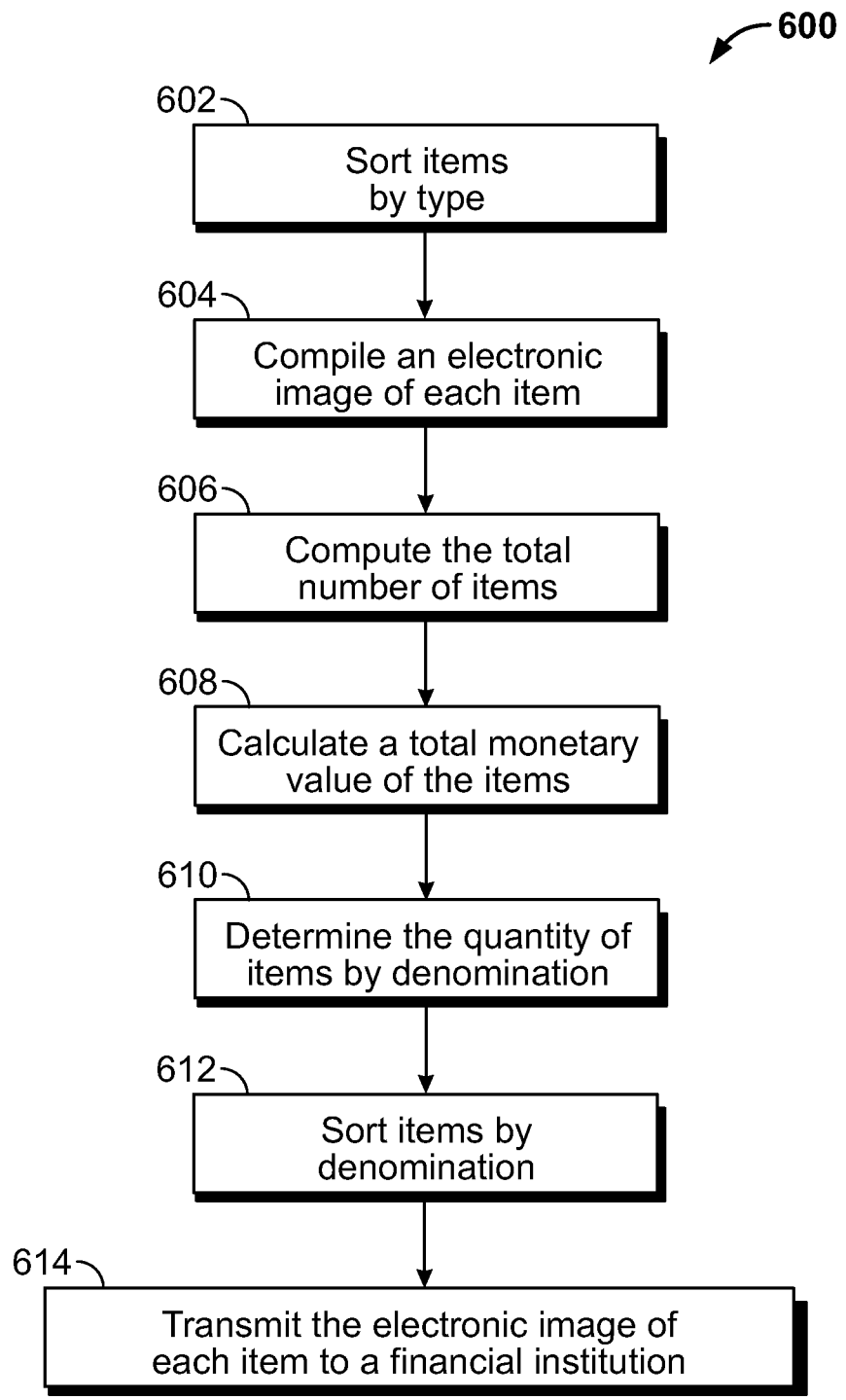
FIG. 6 shows other illustrative steps of another process in accordance with the principles of the invention.

FIG. 6 shows illustrative process 600. Illustrative process 600 may begin at step 602. Process 600 may be performed using any suitable apparatus, such as FPS 200 in FIG. 2.

At step 602, the system may sort one or more items. The items may be sorted by type. The type may be a type of document, attachment, bill, denomination, value or any other suitable type differentiation.

At step 604, the system may compile an image. The image may be an electronic image. The image may be an electronic image of each item. The electronic image may be compiled based on one or more methods implemented by one or more components of FPS 200 of FIG. 2.

At step 606, the system may compute a total. The total may be the total number of items. The total may be the total number of items received via the FPS. The total may be computed for any suitable time period, such as a daily total or monthly total.

At step 608, the system may calculate a value. The value may be a monetary value. The monetary value may be a total monetary value. The total monetary value may be a total monetary value of the items received via the FPS. The total may be calculated for any suitable time period, such as a weekly total or hourly total.

At step 610, the system may determine a quantity. The quantity may be the quantity of items. The quantity of items may be a quantity of items for each denomination. The quantity may be determined for any suitable time period.

At step 612, the system may sort the items. The items may be sorted by denomination.

At step 614, the system may transmit the electronic image from step 604. The electronic image may be an image of each item. The electronic image may be transmitted to a financial institution.

Figure 7:
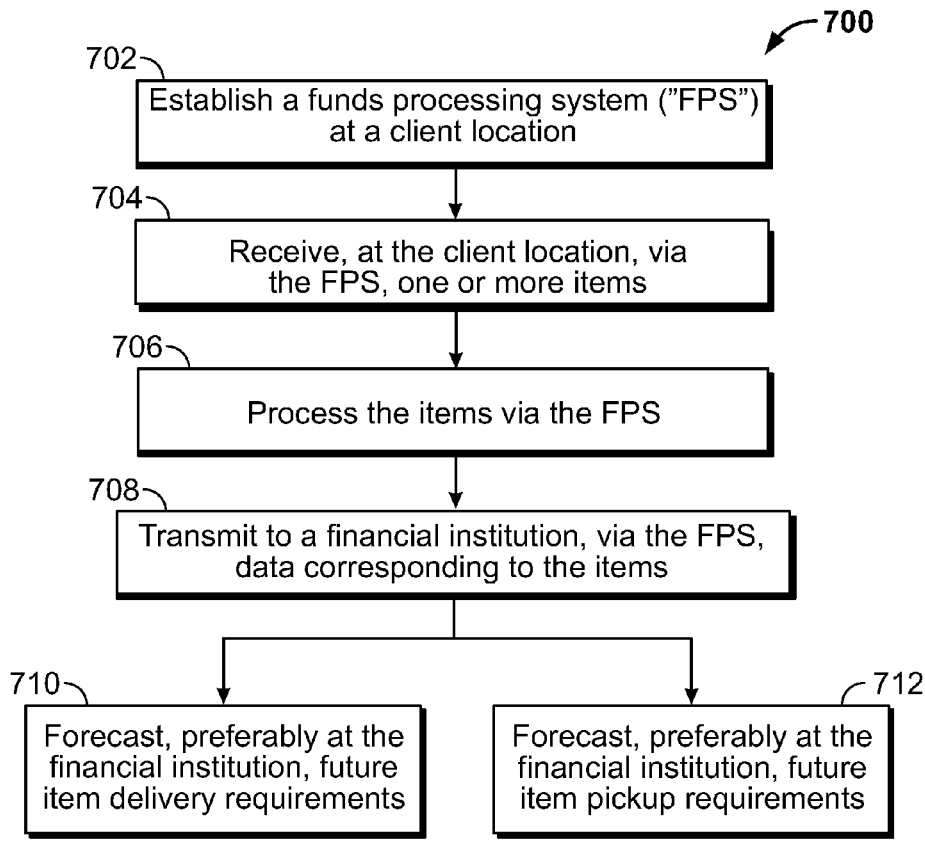
FIG. 7 shows still other illustrative steps of another process in accordance with the principles of the invention.

FIG. 7 shows illustrative process 700. Process may begin at step 702.

At step 702, the system may establish an FPS. The FPS may be established at a client location.

At step 704, the system may receive one or more items. The one or more items may be received via the FPS. The one or more items may be received at the client location.

At step 706, the system may process the items. The items may be processed via the FPS.

At step 708, the system may transmit data. The data may be data corresponding to an item. The data may be transmitted to a financial institution. The data may be transmitted via the FPS.

At step 710, the system may forecast future requirements. The future requirements may be future delivery requirements. The delivery requirements may be financial instrument delivery requirements. The forecast may be determined at the financial institution location. The forecast may be determined at the client location. The forecast may be determined by the financial institution using the FPS at the client location.

The forecast may be an aggregate forecast. The aggregate forecast may be a forecast for one or more client locations. The forecast may be a forecasted result and/or need at one or more client locations. For example, the forecast may be a forecast for future delivery requirements for multiple client locations of a client.

The multiple locations may be all client locations. The multiple locations may be a subset of client locations. For example, future delivery requirements may be forecasted for client locations in a geographical region. The region may be defined by the client. For example, the region may the "northern region," "region 4" or any other suitable region. Alternatively, the forecasted region may be specified based on well-known regional identifiers, such as state, county, municipality, time zone, or any other suitable identifier.

In another example, the future delivery requirements forecast may be a forecasted aggregate amount. The aggregate forecast may therefore predict expected client requirements for cash on hand for a specified region. For example, a forecast may predict a client need of $500,000 of cash on hand, on a weekly basis, for "region 7." In yet a further example, the forecast may determine the aggregate requirements, as well as the individual requirements, for each client location. Thus, the forecast may determine that a branch in a region, such as "Branch 3" in "region 8," may require $150,000 of a $900,000 aggregated forecast.

At step 712, the system may forecast future requirements. The future requirements may be future pickup requirements. The pickup requirements may be item pickup requirements. The forecast may be determined at the financial institution location. The forecast may be determined the client location. The forecast may be determined by the financial institution using the FPS at the client location.

Figure 8:
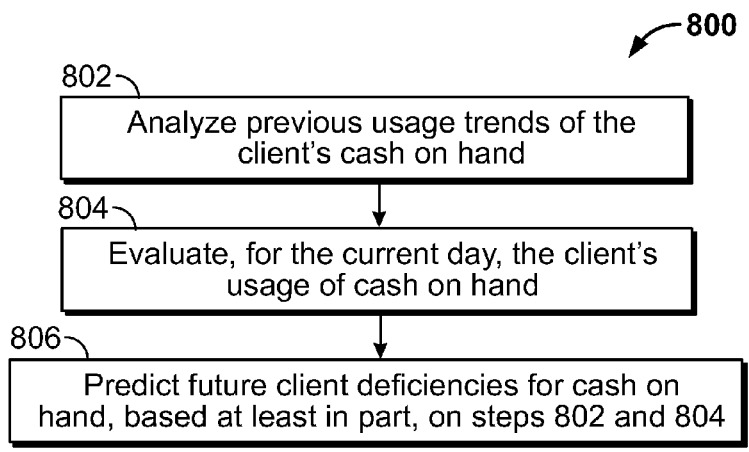
FIG. 8 shows yet other illustrative steps of another process in accordance with the principles of the invention.

FIG. 8 shows illustrative process 800. Process 800 may begin at step 802.

At step 802, the system may analyze a trend. The trend may be a usage trend. The trend may be a previous usage trend. The usage trend may be a client usage trend. The usage trend may be a client usage trend of cash on hand.

At step 804, the system may evaluate current usage. The current usage may be current client usage. The current usage may be client usage for the current day. The current usage may be client current usage of cash on hand.

At step 806, the system may predict future deficiencies. The future deficiencies may be future client deficiencies. The future client deficiencies may be future deficiencies for cash on hand. The deficiencies may be predicted based on, at least in part, steps 802 and 804.

Figure 9:
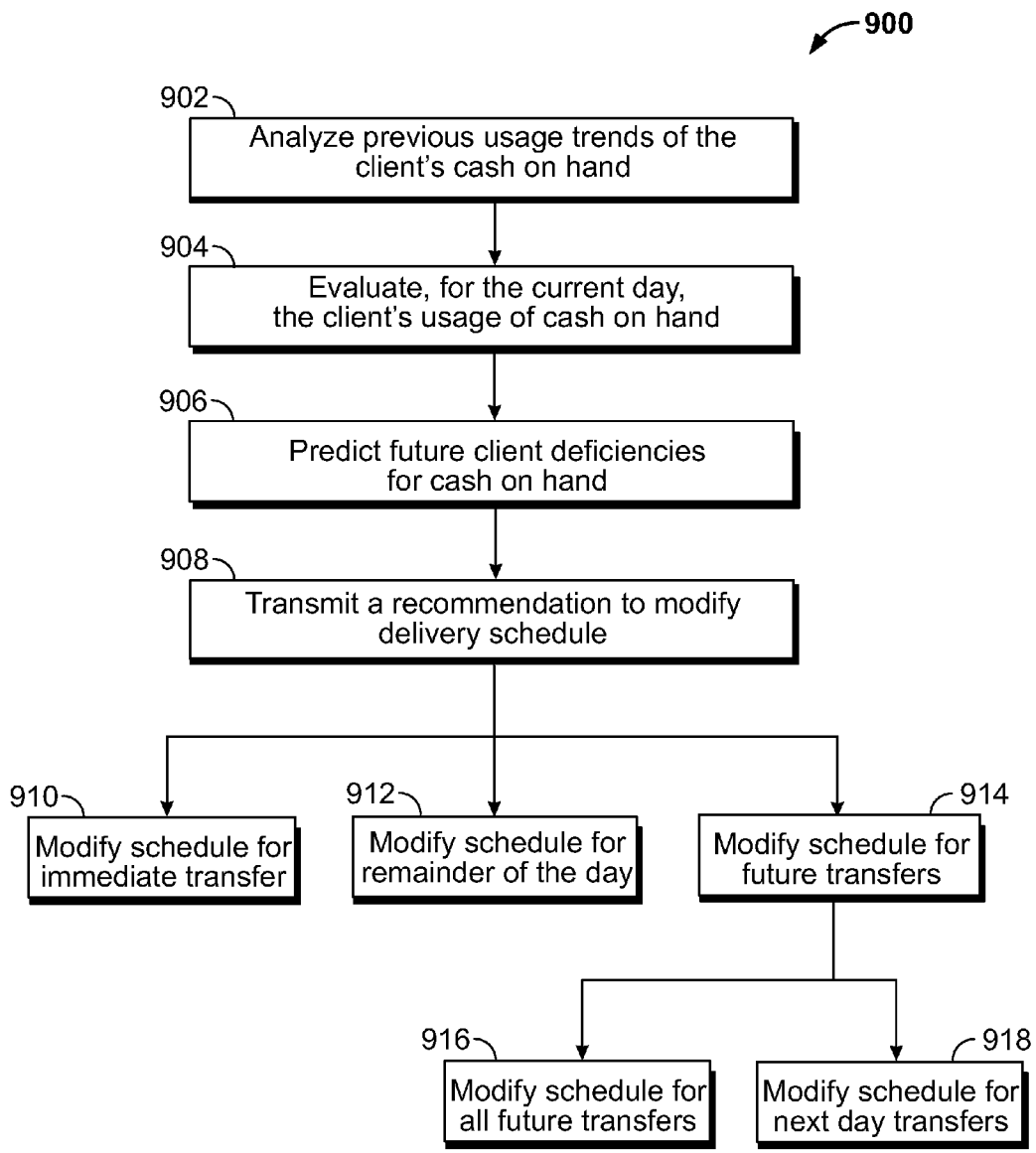
FIG. 9 shows yet other illustrative steps of another process in accordance with the principles of the invention.

FIG. 9 shows illustrative process 900. Process 900 may begin at step 902.

At step 902, the system may analyze a trend. The trend may be a usage trend. The usage trend may be a previous usage trend. The usage trend may be a client usage trend. The client usage trend may be a trend of client usage of cash on hand.

At step 904, the system may evaluate current usage. The current usage may be current client usage. The current usage may be client usage for the current day. The current usage may be client current usage of cash on hand.

At step 906, the system may predict future deficiencies. The future deficiencies may be future client deficiencies. The future client deficiencies may be future deficiencies for cash on hand. The deficiencies may be predicted based on, at least in part, steps 902 and 904.

At step 908, the system may transmit a recommendation. The recommendation may be a recommendation to modify a schedule. The schedule may be a delivery schedule.

Steps 910, 912 and 914 include one or more available modification options.

At step 910, the system may modify a schedule. The schedule may be modified based on a request. The request may be a request for an immediate transfer. The immediate transfer may be an immediate transfer of one or more financial instruments.

At step 912, the system may modify a schedule. The schedule may be modified based on a request. The request may be a request to modify the delivery schedule for the remainder of a current day.

At step 914, the system may modify a schedule. The schedule may be modified based on a request. The request may be a request to modify a future delivery schedule.

At step 916, the system may modify all future delivery schedules.

At step 918, the system may modify the future delivery for the following day.

Figure 10:
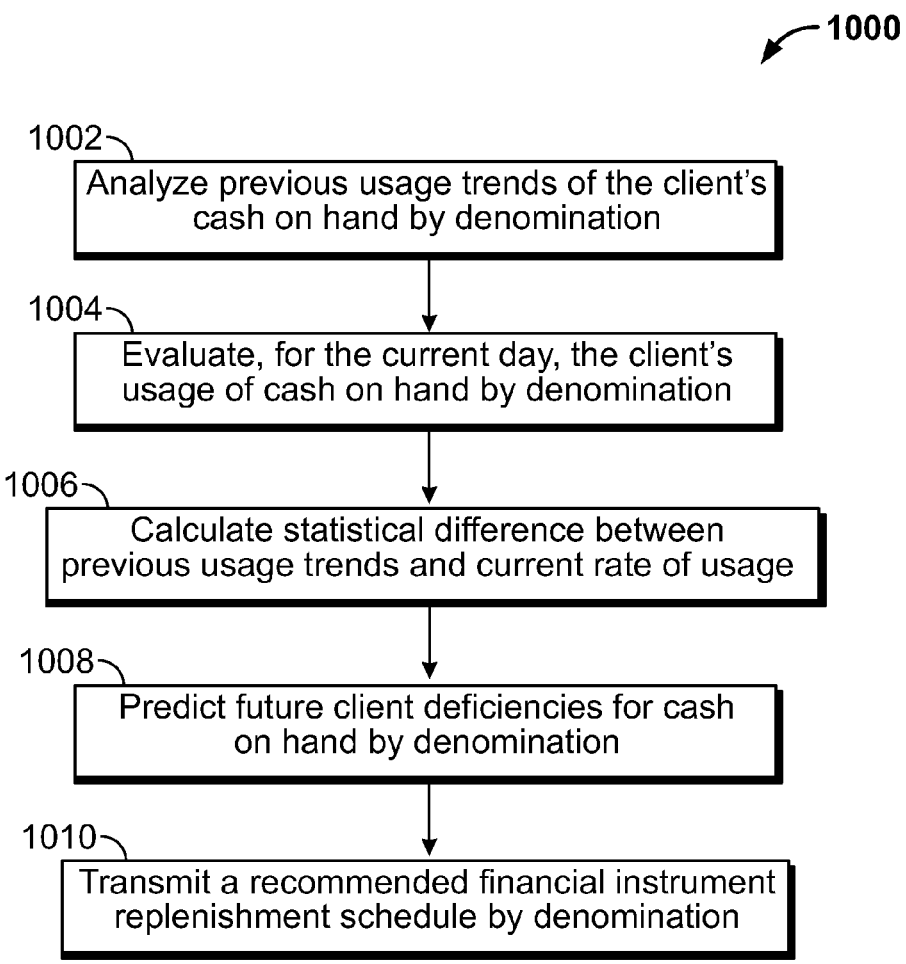
FIG. 10 shows illustrative steps of yet another process in accordance with the principles of the invention.

FIG. 10 shows illustrative process 1000. Process 1000 may begin at step 1002.

At step 1002, the system may analyze a trend. The trend may be a usage trend. The usage trend may be a previous usage trend. The usage trend may be a client usage trend. The client usage trend may be a trend of client usage of cash on hand. The usage trend may be a client usage trend of cash on hand for each denomination.

At step 1004, the system may evaluate current usage. The current usage may be current client usage. The current usage may be client usage for the current day. The current usage may be client current usage of cash on hand. The current usage may be current client usage of cash on hand for each denomination.

At step 1006, the system may calculate a difference. The difference may be a statistical difference. The statistical difference may be a difference between previous usage trends and current rate of usage.

At step 1008, the system may predict future deficiencies. The future deficiencies may be future client deficiencies. The future client deficiencies may be future deficiencies for cash on hand. The future client deficiencies for cash on hand may be future deficiencies of cash on hand for each denomination. The deficiencies may be predicted based on, at least in part, steps 1002, 1004 and 1006.

At step 1010, the system may transmit a recommendation. The recommendation may be transmitted to a financial institution. The recommendation may be a recommended schedule. The schedule may be a recommended replenishment schedule. The replenishment may be financial instrument replenishment. The replenishment may be a replenishment for each financial instrument denomination.

Figure 11:
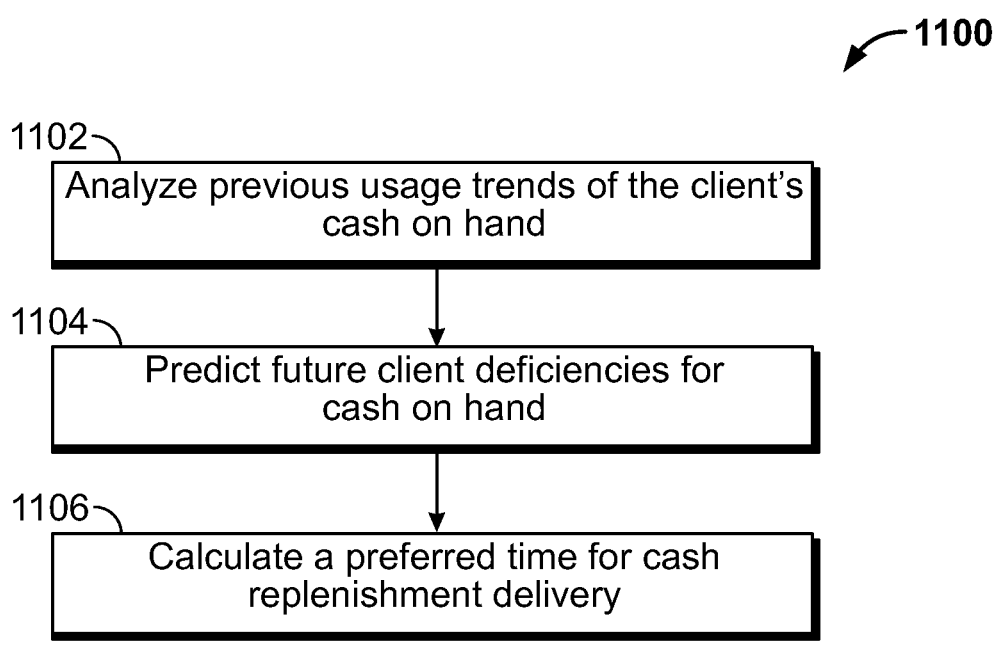
FIG. 11 shows illustrative steps of yet another process in accordance with the principles of the invention.

FIG. 11 shows illustrative process 1100. Process 1100 may begin at step 1102.

At step 1102, the system may analyze a trend. The trend may be a usage trend. The usage trend may be a previous usage trend. The usage trend may be a client usage trend. The client usage trend may be a trend of client usage of cash on hand. The usage trend may be a client usage trend of cash on hand for each denomination.

At step 1104, the system may predict a deficiency. The deficiency may be a future deficiency. The deficiency may be a client deficiency. The deficiency may be a future client deficiency for cash on hand.

At step 1106, the system may calculate a time. The time may be a preferred or optimal time. The time may be a preferred time for a delivery. The delivery may be a cash delivery. The delivery may be a cash replenishment delivery.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage encoded media including memory storage device.

One of ordinary skill in the art will appreciate that the elements shown and described herein may be performed in other than the recited order and that one or more elements illustrated may be optional. The methods of the above-referenced embodiments may involve the use of any suitable elements, elements, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems or methods for deposit information reporting and reconciliation of information reporting are therefore provided. Persons skilled in the art will appreciate that the present invention can be practiced by other than the described embodiments, which are presented for purposes of illustration rather than of limitation, and that the present invention is limited only by the claims that follow.

What is claimed is:

1. An apparatus for tracking items, the apparatus comprising:
   a funds processing device ("FPD"), wherein the FPD is established at a client location;
   a receiver including hardware configured to receive, via the FPD, a plurality of items, said items comprising:
      one or more financial instruments; and
      one or more attachments;
   a processor configured to process, via the FPD, the plurality of items; and
   a transmitter configured to transmit, via the FPD, to a financial institution, data corresponding to the items, wherein, the processor is further configured to calculate an estimated arrival time of the items at the financial institution and the receiver is further configured to receive tracking information;
   a barcode device residing within the FPD, said barcode device comprising:
      a barcode generator configured to generate a unique barcode;
      a barcode printer configured to print the unique barcode; and
      an affixer device configured to affix the barcode to a container storing at least a portion of the items, wherein the barcode is configured to provide, at a second location, the tracking information for confirming the estimated arrival time of the container.

2. The apparatus of claim 1 further comprising:
   the receiver further configured to receive data corresponding to a scanning of the barcode; and
   the processor further configured to:
      produce updated tracking information based at least in part on the data; and
      recalculate, based on the updated tracking information, the estimated arrival time of the items at the financial institution.

3. The apparatus of claim 2 wherein the estimated arrival time is calculated based on an analysis of previous cash transfer data.

4. The apparatus of claim 3 wherein the previous cash transfer data comprises data corresponding to financial institution processing volume.

5. The apparatus of claim 3 wherein the previous cash transfer data comprises data corresponding to average time to process a pre-determined number of items.

6. The apparatus of claim 3 wherein the previous cash transfer data comprises data corresponding to time of transit.

7. The apparatus of claim 1 further comprising:
   the receiver further configured to receive current condition data; and
   the processor further configured to calculate the estimated arrival time based on the current condition data.

8. The apparatus of claim 7 wherein current condition data comprises:
   current traffic conditions;
   current weather conditions;
   current processing center volume;
   time of day;
   current location of the items;
   number of non-cash items;
   number of cash items; and
   number of flagged items.

9. The apparatus of claim 1 further comprising the processor further configured to forecast an estimated time of cash flow availability.

* * * * *